US008989573B2

(12) United States Patent
Park et al.

(10) Patent No.: US 8,989,573 B2
(45) Date of Patent: Mar. 24, 2015

(54) SENSING APPARATUS

(71) Applicant: Gwangju Institute of Science and Technology, Gwangju (KR)

(72) Inventors: Chang-Soo Park, Gwangju (KR); Young-Bok Kim, Gwangju (KR); Sie-Wook Jeon, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 177 days.

(21) Appl. No.: 13/852,759

(22) Filed: Mar. 28, 2013

(65) Prior Publication Data

US 2013/0266321 A1 Oct. 10, 2013

Related U.S. Application Data

(60) Provisional application No. 61/620,440, filed on Apr. 5, 2012.

(51) Int. Cl.
*H04B 10/00* (2013.01)
*H04J 14/02* (2006.01)
*H04J 14/00* (2006.01)

(52) U.S. Cl.
CPC .......... *H04J 14/0223* (2013.01); *H04J 14/005* (2013.01)
USPC ........... 398/33; 398/84; 398/214; 250/227.14

(58) Field of Classification Search
USPC ................ 398/25–33, 83–85, 214; 250/227.14–227.19
See application file for complete search history.

(56) References Cited

U.S. PATENT DOCUMENTS

| | | | | | |
|---|---|---|---|---|---|
| 4,889,986 | A | * | 12/1989 | Kersey et al. | 250/227.19 |
| 5,216,693 | A | * | 6/1993 | Nakamura | 375/142 |
| 5,426,297 | A | * | 6/1995 | Dunphy et al. | 250/227.23 |
| 5,592,282 | A | * | 1/1997 | Hartog | 356/44 |
| 5,680,489 | A | * | 10/1997 | Kersey | 385/12 |
| 5,818,585 | A | * | 10/1998 | Davis et al. | 356/477 |
| 5,838,437 | A | * | 11/1998 | Miller et al. | 356/478 |
| 5,889,901 | A | * | 3/1999 | Anderson et al. | 385/12 |
| 5,987,197 | A | * | 11/1999 | Kersey | 385/24 |
| 5,995,255 | A | * | 11/1999 | Giles | 398/34 |
| 6,072,567 | A | * | 6/2000 | Sapack | 356/32 |
| 6,075,907 | A | * | 6/2000 | Krol | 385/12 |
| 6,137,565 | A | * | 10/2000 | Ecke et al. | 356/35.5 |
| 6,204,920 | B1 | * | 3/2001 | Ellerbrock et al. | 356/477 |
| 6,212,306 | B1 | * | 4/2001 | Cooper et al. | 385/12 |
| 6,285,806 | B1 | * | 9/2001 | Kersey et al. | 385/12 |

(Continued)

*Primary Examiner* — Agustin Bello
(74) *Attorney, Agent, or Firm* — Saliwanchik, Lloyd & Eisenschenk

(57) ABSTRACT

A sensing apparatus includes: a broadband optical source; a first pseudorandom number generator generating a first pseudorandom number code string to modulate the broadband optical source; at least one sensor reflecting an output of the first pseudorandom number generator at a wavelength corresponding to a center wavelength thereof when the output of the first pseudorandom number generator is inputted; a wavelength-time converter converting an output of the sensor by wavelength-time conversion; a second pseudorandom number generator generating a second pseudorandom number code string which is different in frequency from and is the same in bit length and code string as the first pseudorandom number code string; a mixer mixing an output signal of the wavelength-time converter with an output signal of the second pseudorandom number generator; and an integrator integrating an output of the mixer.

20 Claims, 4 Drawing Sheets

(56) References Cited

U.S. PATENT DOCUMENTS

| | | | |
|---|---|---|---|
| 6,346,702 B1 * | 2/2002 | Davis et al. | 250/227.14 |
| 6,417,507 B1 * | 7/2002 | Malvern et al. | 250/227.14 |
| 6,453,095 B2 * | 9/2002 | Feng et al. | 385/37 |
| 6,489,606 B1 * | 12/2002 | Kersey et al. | 250/227.14 |
| 6,525,308 B1 * | 2/2003 | Schmidt-Hattenberger | 250/227.23 |
| 6,571,027 B2 * | 5/2003 | Cooper et al. | 385/12 |
| 6,591,025 B1 * | 7/2003 | Siems et al. | 385/12 |
| 6,647,160 B1 * | 11/2003 | Chi et al. | 385/12 |
| 6,674,928 B2 * | 1/2004 | Johnson et al. | 385/12 |
| 6,680,472 B1 * | 1/2004 | Thingbø et al. | 250/227.12 |
| 6,765,194 B2 * | 7/2004 | Holz et al. | 250/227.12 |
| 6,785,004 B2 * | 8/2004 | Kersey et al. | 356/478 |
| 6,788,418 B1 * | 9/2004 | Kringlebotn | 356/477 |
| 6,829,397 B2 * | 12/2004 | Wang et al. | 385/12 |
| 6,876,786 B2 * | 4/2005 | Chliaguine et al. | 385/13 |
| 6,892,031 B2 * | 5/2005 | Lee | 398/78 |
| 6,933,845 B2 * | 8/2005 | Howard | 340/556 |
| 6,961,120 B2 * | 11/2005 | Pang et al. | 356/73.1 |
| 7,002,672 B2 * | 2/2006 | Tsuda | 356/73.1 |
| 7,030,971 B1 * | 4/2006 | Payton | 356/35.5 |
| 7,068,881 B2 * | 6/2006 | Yoo | 385/31 |
| 7,109,471 B2 * | 9/2006 | Taverner | 250/227.14 |
| 7,119,325 B2 * | 10/2006 | Pieterse et al. | 250/227.14 |
| 7,154,082 B2 * | 12/2006 | Maas | 250/227.18 |
| 7,268,863 B2 * | 9/2007 | Payton | 356/73.1 |
| 7,271,884 B2 * | 9/2007 | Payton | 356/73.1 |
| 7,274,441 B2 * | 9/2007 | Payton | 356/73.1 |
| 7,480,056 B2 * | 1/2009 | Waagaard et al. | 356/478 |
| 7,480,460 B2 * | 1/2009 | Colpitts et al. | 398/108 |
| 7,633,052 B2 * | 12/2009 | Nakamura et al. | 250/227.14 |
| 7,689,124 B2 * | 3/2010 | Yeon et al. | 398/78 |
| 7,696,471 B2 * | 4/2010 | Ogisu et al. | 250/227.14 |
| 8,401,401 B2 * | 3/2013 | Hartog et al. | 398/205 |
| 8,854,608 B2 * | 10/2014 | Onoda et al. | 356/73.1 |
| 2003/0035187 A1 * | 2/2003 | Richardson et al. | 359/189 |
| 2004/0113055 A1 * | 6/2004 | Whelan et al. | 250/227.18 |
| 2004/0175188 A1 * | 9/2004 | Bellemare et al. | 398/186 |
| 2005/0100338 A1 * | 5/2005 | Yeon et al. | 398/78 |
| 2006/0018586 A1 * | 1/2006 | Kishida | 385/12 |
| 2006/0263090 A1 * | 11/2006 | Lee et al. | 398/79 |
| 2007/0171402 A1 * | 7/2007 | Watley et al. | 356/73.1 |
| 2008/0117046 A1 * | 5/2008 | Cruzado | 340/568.2 |
| 2008/0316494 A1 * | 12/2008 | Hartog et al. | 356/446 |
| 2009/0008536 A1 * | 1/2009 | Hartog et al. | 250/227.14 |
| 2010/0080386 A1 * | 4/2010 | Donnangelo et al. | 380/256 |
| 2011/0255078 A1 * | 10/2011 | Goldner et al. | 356/73.1 |
| 2013/0266321 A1 * | 10/2013 | Park et al. | 398/79 |
| 2014/0083197 A1 * | 3/2014 | Zadok et al. | 73/800 |

\* cited by examiner

SENSING APPARATUS

CROSS-REFERENCE TO RELATED APPLICATION

This application claims the benefit under 35 U.S.C. §119 of U.S. Patent Application No. 61/620,440, filed Apr. 5, 2012, which is hereby incorporated by reference in its entirety.

BACKGROUND

The present disclosure relates to a sensing apparatus.

A sensor using an optical fiber is advantageous in that it is free of corrosion, exhibits high endurance, and has electromagnetic interference immunity. Particularly, an optical reflector such as an optical fiber Bragg grating is suitable for the use as a sensor because of its small size and high sensitivity to the temperature and strain.

Sensor networks using an optical reflector are classified into a wavelength division multiplexing (WDM) method in which a variation in center wavelength of each sensor is sensed with respect to strain applied from an outside and a variation in temperature, a time division multiplexing (TDM) method in which each sensor has the same center wavelength and a pulse string having a period that is longer than a distance between sensors is transmitted to the sensors to measure variation in output power reflected by each sensor, and a code division multiplexing (CDM) method in which an input light source is modulated using a pseudorandom number generator, the modulated light source is transmitted to each sensor, and then variation in autocorrelation value of a pseudorandom number returning to each sensor is measured.

The WDM method has been widely used in that it has a high resolution and may be easily realized compared with other systems, but has a limitation in that the number of sensors is limited because when a center wavelength of a sensor is changed by an external factor, the center wavelength of the sensor may not overlap a center wavelength of another neighboring sensor.

The TDM method has solved the limitation in the number of sensors by using sensors having the same center wavelength and an optical reflector having a low reflectivity to measure a variation in output power returning from each sensor. However, since the TDM method makes the design of a signal processor be complicated, it is expensive in price, and since the TDM method uses a single pulse, it has a limitation such as a low response rate, compared with other methods.

The CDM method may be realized by modulating a signal of an optical source by a pseudorandom code to transmit a code string to each sensor, and autocorelating the code string returning from each sensor. The CDM method may realize a demodulation circuit for a sensor system only with a low price electrical device without a high speed signal processing circuit.

However, since the related art CDM sensor uses a variable laser in order to increase the operation range, it requires a long scanning time and a delay for synchronizing the pseudorandom number code reflected and returning from each sensor and an originally generated pseudorandom code for autocorrelation. Also, since the variation in output power of autocorrelation value is measured, if the wavelength deviates from the center wavelength of the sensor, the measurement may be impossible.

BRIEF SUMMARY

Embodiments provide a code division multiplexing sensing apparatus that may increase the number of sensors to be measured and enhance the scanning rate by using a broadband optical source enabling a high speed modulation, enhance the measurement range of sensors by moving a variation in center wavelength of sensors to a variation in time axis and observing the moved variation, an may monitor a plurality of sensors at the same time through autocorrelation even without a delay.

In one embodiment, a sensing apparatus includes: a broadband optical source; a first pseudorandom number generator generating a first pseudorandom number code string to modulate the broadband optical source; at least one sensor reflecting an output of the first pseudorandom number generator at a wavelength corresponding to a center wavelength thereof when the output of the first pseudorandom number generator is inputted; a wavelength-time converter converting an output of the sensor by wavelength-time conversion; a second pseudorandom number generator generating a second pseudorandom number code string which is different in frequency from and is the same in bit length and code string as the first pseudorandom number code string; a mixer mixing an output signal of the wavelength-time converter with an output signal of the second pseudorandom number generator; and an integrator integrating an output of the mixer.

In another embodiment, a sensing apparatus includes: a broadband optical source; a first pseudorandom number generator generating a first pseudorandom number code string to modulate the broadband optical source; a optical amplifier amplifying the modulated broadband optical source; at least one sensor reflecting an output of the first pseudorandom number generator at a wavelength corresponding to a center wavelength thereof when the output of the first pseudorandom number generator is inputted; a wavelength-time converter converting an output of the sensor by wavelength-time conversion; a light detector converting an output of the wavelength-time converter to an electrical signal; an electrical signal amplifier amplifying an output of the light detector; a second pseudorandom number generator generating a second pseudorandom number code string which is different in frequency from and is the same in bit length and code string as the first pseudorandom number code string; a mixer mixing an output signal of the electrical signal amplifier with an output of the second pseudorandom number generator; and an integrator integrating an output of the mixer.

In further another embodiment, a sensing apparatus includes: a broadband optical source; a first pseudorandom number generator generating a first pseudorandom number code string to modulate the broadband optical source; at least one sensor reflecting an output of the first pseudorandom number generator at a wavelength corresponding to a center wavelength thereof when the output of the first pseudorandom number generator is inputted; a second pseudorandom number generator generating a second pseudorandom number code string which is different in frequency from and is the same in bit length and code string as the first pseudorandom number code string; a mixer mixing an output signal of the sensor with an output signal of the second pseudorandom number generator; and an integrator integrating an output of the mixer.

According to the present invention, the number of sensors to be measured may be increased and the scan rate may be enhanced by using a broadband optical source enabling a high speed modulation, the measurement range of sensors may be enhanced by moving a variation in center wavelength of sensors to a variation in time axis and observing the moved variation, an a plurality of sensors may be monitored at the same time through autocorrelation even without a delay.

DETAILED DESCRIPTION

Reference will now be made in detail to the embodiments of the present disclosure, examples of which are illustrated in the accompanying drawings.

Hereinafter, a sensing apparatus according to an embodiment will now be described.

Figure 1:
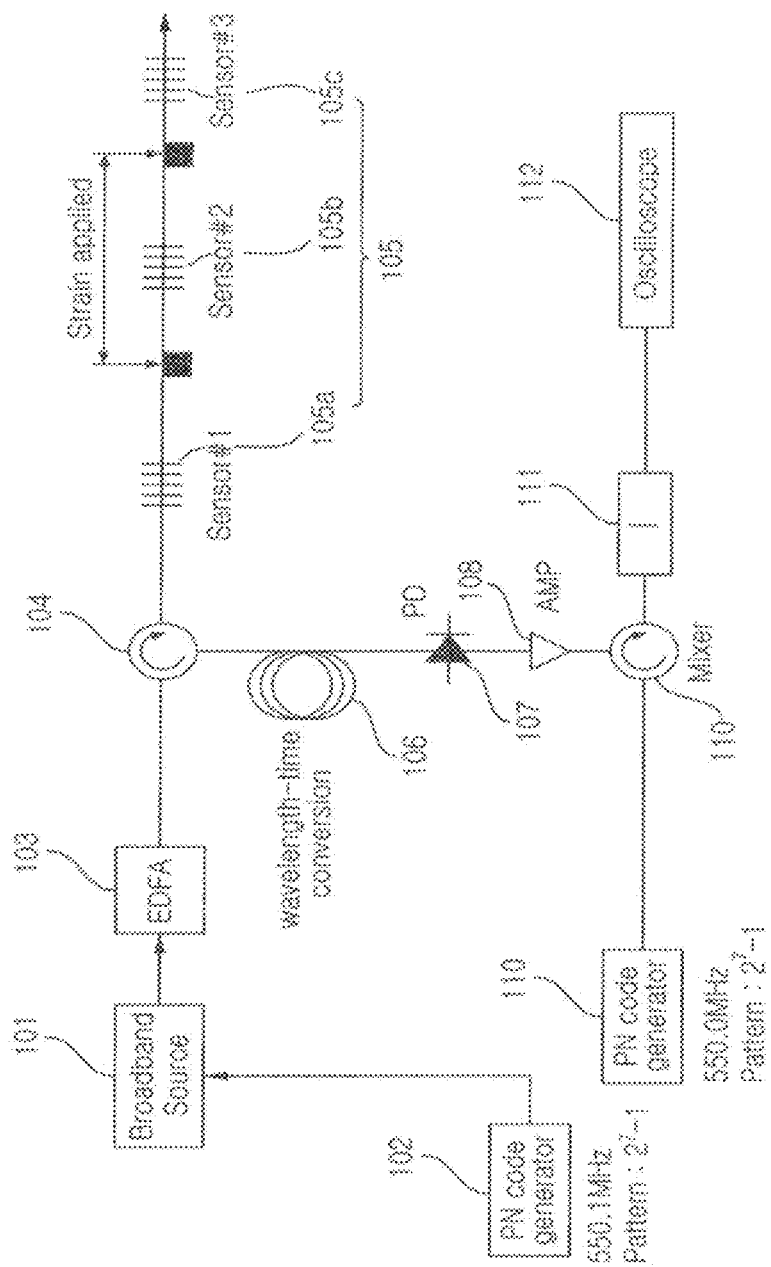
FIG. 1 is a block diagram of a sensing apparatus according to a preferred embodiment of the present invention.

FIG. 1 is a block diagram of a sensing apparatus according to an embodiment.

Referring to FIG. 1, a sensing apparatus according to an embodiment includes: a broadband optical source 101; a first pseudorandom number generator 102 generating a first pseudorandom number code string to modulate the broadband optical source; a optical amplifier 103 amplifying the modulated broadband optical source; at least one sensor 105 reflecting an output of the optical amplifier 103 at a wavelength corresponding to a center wavelength thereof when the output of the optical amplifier 103 is inputted; a wavelength-time converter 106 converting an output of the sensor 105 by wavelength-time conversion; an electrical signal amplifier 108 amplifying an output of the light detector 107; a second pseudorandom number generator 109 generating a second pseudorandom number code string which is different in frequency from and is the same in bit length and code string as the first pseudorandom number code string; a mixer 110 mixing an output signal of the electrical signal amplifier 108 with an output of the second pseudorandom number generator 109; and an integrator 111 integrating an output of the mixer 110.

The elements of the sensing apparatus having the above-mentioned configuration according to the embodiment will be described in detail.

The broadband optical source 101 is preferably a light source oscillating by broadband spectral light, such as a high luminance light emitting diode (SLED), a semiconductor optical amplifier (SOA), or a reflective semiconductor optical amplifier (RSOA). While the embodiment exemplarily describes that the broadband optical source 101 is a reflective semiconductor optical amplifier, the present invention is not limited thereto. Any broadband source will be possible if it may perform a high speed modulation.

The amplification factor of the reflective semiconductor optical amplifier (RSOA) may be obtained by using the standard theory of Fabry-Perot and is given by Equation 1.

$$G_{FP}(v) = \frac{(1-R_1)(1-R_2)G(v)}{\left(1 - G\sqrt{R_1 R_2}\right)^2 + 4G\sqrt{R_1 R_2}\sin^2[\pi(v-v_m)/\Delta v_L]},$$ [Equation 1]

where $R_1$ and $R_2$ are the input and output facet reflectivity, $v_m$ represents the cavity resonance frequency, $\Delta v_L$ is the longitudinal mode spacing, and $G(v)$ is the frequency dependent single pass amplification factor defined by Equation 2.

$$G(v) = e^{g(v)L},$$ [Equation 2]

where L is the length of the cavity, and $g(v)$ is the amplification factor gain.

For an ideal SOA, $R_1=R_2=0$ and then the gain is equal to the single pass gain.

For an ideal RSOA, the photon traveling length is double that of the cavity length, then $L_{ROSA}=2L_{SOA}$ and may be expressed as Equation 3.

$$G_{RSOA}(n) = e^{[g(n)L_{ROSA}]} = e^{[g(n)2L_{SOA}]} = \{G_{SOA}(n)\}^2.$$ [Equation 3]

The first pseudorandom number generator 102 generates a first pseudorandom number code string to modulate the broadband source. In the description of the present embodiment, the first pseudorandom number generator 102 generates a first pseudorandom number code string having, for example, the frequency of 500.1 [MHz] and the bit length of $2^7-1$ (=127) to module the broadband source.

The optical amplifier 103 amplifies the broadband source modulated by the first pseudorandom number code string and allows the modulated and amplified broadband source to be inputted to the respective sensors through a circulator 104 and a distributor (not shown).

Each of the sensors 105 may be configured to include an optical reflector (not shown) reflecting a wavelength corresponding to the center wavelength thereof when the output of the optical amplifier 103 is inputted. The optical reflector is a Bragg grating or a thin dielectric filter connected to an output terminal of the broadband optical source and having single wavelength full reflection or partial reflection characteristics.

In the description of the present embodiment, it is exemplified that the sensing apparatus is provided with three sensors 105 including first to third sensors 105a, 105b, and 105c, the center wavelengths of the first to third sensors 105a, 105b, and 105c are 1550.9 [nm], 1552.6 [nm], and 1555.8 [nm], and the reflectivity is equal to 99[%].

The sensors 105a, 105b, and 105c may be arranged in series, in parallel, in a ring pattern, in a star pattern, or in a bus pattern, and may be arranged variously within the scope that does not deviate from the gist of the present invention.

The wavelength-time converter 106 converts a spectrum variation in each sensor (i.e., a variation in center wavelength) to a time shift by using wavelength to time conversion when the outputs of the sensors 105a, 105b, and 105c are inputted through the circulator 104. An example of the wavelength-time converter 106 is a dispersion compensating fiber (DCF). The DCF converts a shift in center wavelength of each of the sensors generated due to variations in temperature and pressure applied to the respective sensors to the time shift. In the present embodiment, it is exemplified that the dispersion value of the DCF is −1344.8 [ps/nm] at 1550 [nm].

The optical detector 107 is provided to the output terminal of the wavelength-time converter 106 to convert the output of the wavelength-time converter 106 to an electrical signal.

A band pass filter (not shown) which has a wavelength corresponding to the wavelength of each sensor and a wider pass band may be further provided between the wavelength-time converter 106 and the optical detector 107, thereby minimizing amplification of a noise generated in the optical amplifier. Also, by using the broadband optical source having a high output power, it will be possible to monitor the sensors without the band pass filter.

The electrical signal amplifier 108 is provided to an output terminal of the optical detector 107 to amplify the output of the optical detector 107.

The second pseudorandom number generator 109 generates a second pseudorandom number code string which is different in frequency from and is the same in bit length and code string as the first pseudorandom number code string. In description of the present invention, it is exemplified that the second pseudorandom number generator 109 generates a second pseudorandom number code string having a frequency of 500 [MHz] and a bit length of $2^7-1$ (=127).

The second pseudorandom number code string outputted from the second pseudorandom number generator 109, and the output of the electrical signal amplifier 108 are autocorrelated through the mixer 110 and the integrator 111. An input terminal of the mixer 110 is connected the an output terminal of the second pseudorandom number generator 109 and an output terminal of the electrical signal amplifier 108, an output terminal of the mixer 110 is connected to an input terminal of the integrator 111, the mixer 110 mixes and outputs the second pseudorandom number code string generated in the second pseudorandom number generator 109 and the output of the electrical signal amplifier 108, and the integrator 111 integrates and outputs the output of the mixer 110.

The sensing apparatus according to the embodiment may monitor the sensors by observing the output variation of the integrator 111 with time. In the description of the present embodiment, it is exemplified that an oscilloscope 112 is provided for observing the output of the integrator 111.

Figure 2:
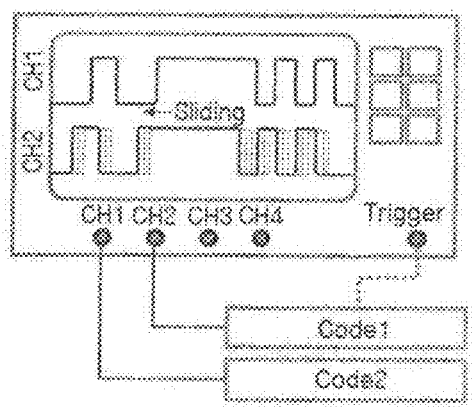
FIGS. 2 and 3 are schematic views for explaining the sliding autocorrelation in FIG. 1.
Figure 3:
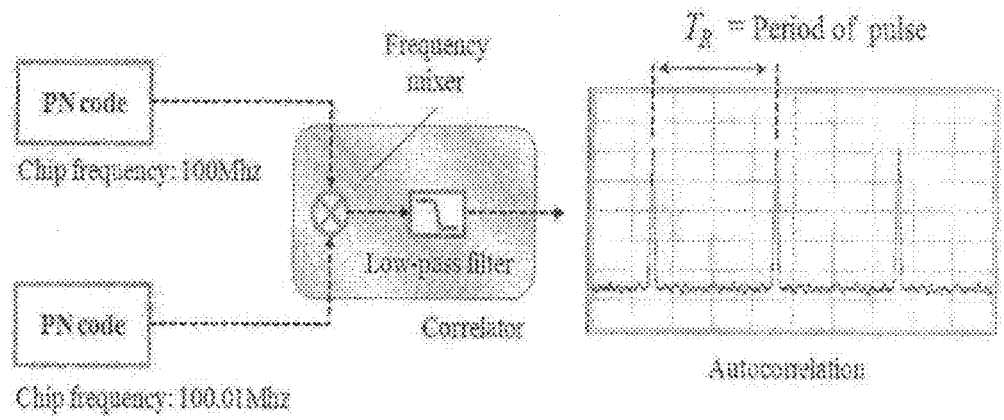

FIGS. 2 and 3 are schematic views for explaining the sliding autocorrelation performed through the mixer 110 and the integrator 111 in the sensing apparatus according to the preferred embodiment of the present invention.

Specifically, FIG. 2 exemplarily shows that code 1 and code 2 that have the same bit length and the same code type but have slightly different frequencies from each other are connected to the oscilloscope. When code 1 is taken by a trigger, since code 2 is the same in type and bit length as but is slightly different in operation frequency from code 1, code 2 will appear slide. Thus, sliding autocorrelation may be performed through the above method. Herein, the sliding speed is determined by a frequency gap between the two codes, and the repetition of correlation is defined as Equation 4.

$$T_R = n/\Delta f,$$ [Equation 4]

where n is the code bit length and $\Delta f$ is the frequency gap. The bandwidth of the autocorrelation peak is also given by Equation 5.

$$T_{width} = 2/\Delta f.$$ [Equation 5]

Referring to FIG. 3, when two pseudorandom number codes having different frequencies of 100 [MHz] and 100.01 [MHz] and the same code bit length of 31 are autocorrelated using the mixer and the integrator, the repetition time and the bandwidth calculated by Equations 4 and 5 are 3.10 [ms] and 0.20 [ms], respectively, which show approximate coincidence with the measured values of 3.09 [ms] and 0.23 [ms].

Figure 4:
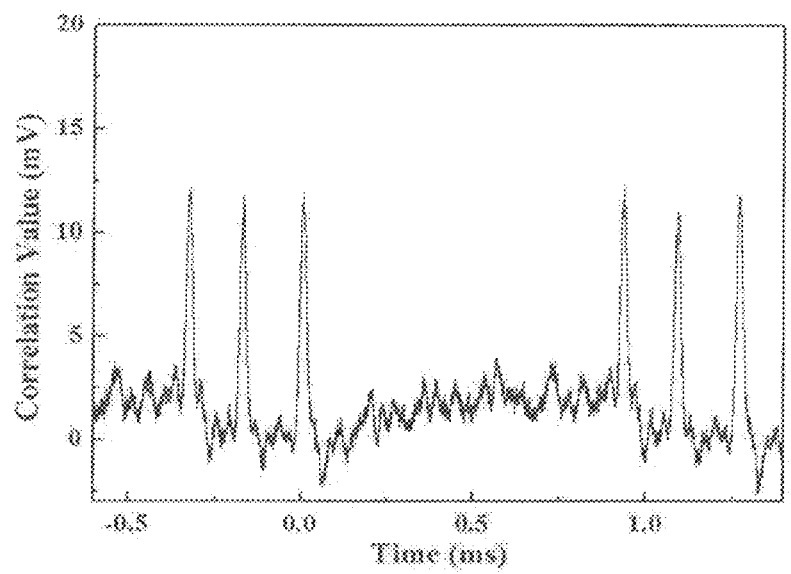
FIG. 4 is a graph showing a variation in autocorrelation value with time in the sensing apparatus of FIG. 1.

FIG. 4 is a graph showing a variation in autocorrelation value with time in the sensing apparatus according to the preferred embodiment.

Referring to FIG. 4, it may be seen that the period of pulse is 1.27 [ms]. Since the period of pulse is determined by the center wavelength and the bit length, the time (i.e., the period of pulse) may be shortened or extended.

As in the sensing apparatus according to the present embodiment, since the number of measurable sensors in the CDM method is determined by the bit length, it is possible to monitor about 100 sensors when the pseudorandom number generator generating the pseudorandom number code string of $2^7-1$ (=127) is used.

Figure 5:
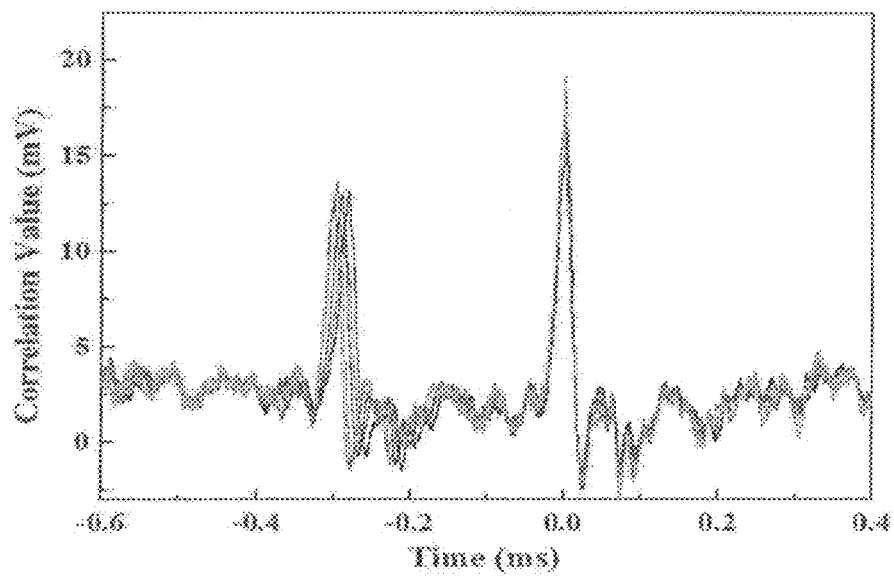
FIG. 5 is a graph showing example 1 in which a variation in autocorrelation value is observed after a pressure is applied to the second sensor of FIG. 1.

FIG. 5 is a graph showing example 1 in which a variation in autocorrelation value is observed after a pressure is applied to the second sensor 105b among the first to third sensors 105a, 105b, and 105c shown in FIG. 1.

Referring to FIG. 5, when a pressure is applied to the second sensor 105b to move the center wavelength and then correlation between the second sensor 105b and the third sensor 105c is observed, it may be seen that the third sensor 105c is independent on the variation in autocorrelation value with time by the variation in center wavelength of the second sensor 105b. Herein, the sensitivity of the sensors 105a, 105b, and 105c is determined through the sensitivity of the wavelength-time converter 106 and the adjustment of an interval between the center wavelengths.

Figure 6:
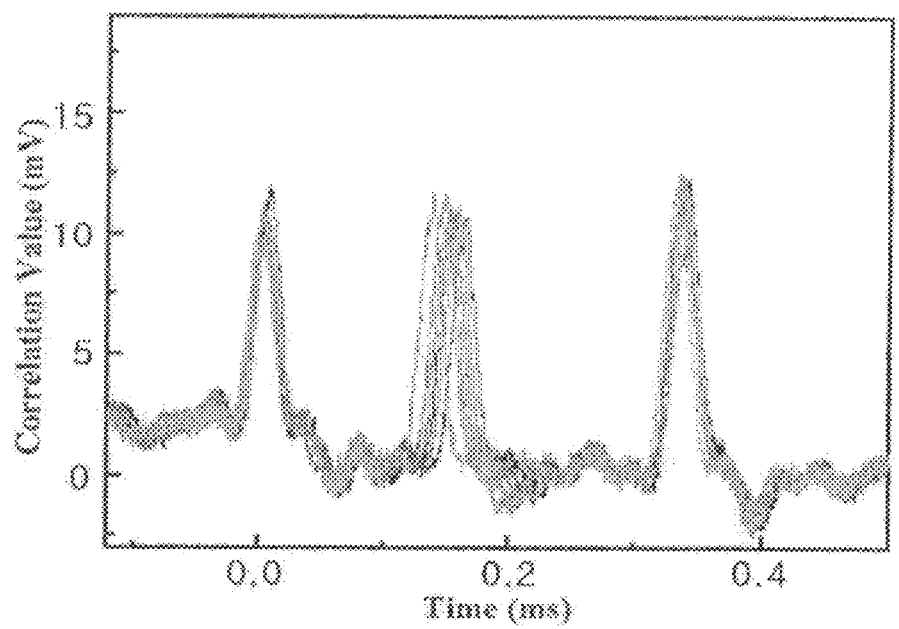
FIG. 6 is a graph showing example 2 in which a variation in autocorrelation value is observed after a pressure is applied to the second sensor of FIG. 1.
Figure 7:
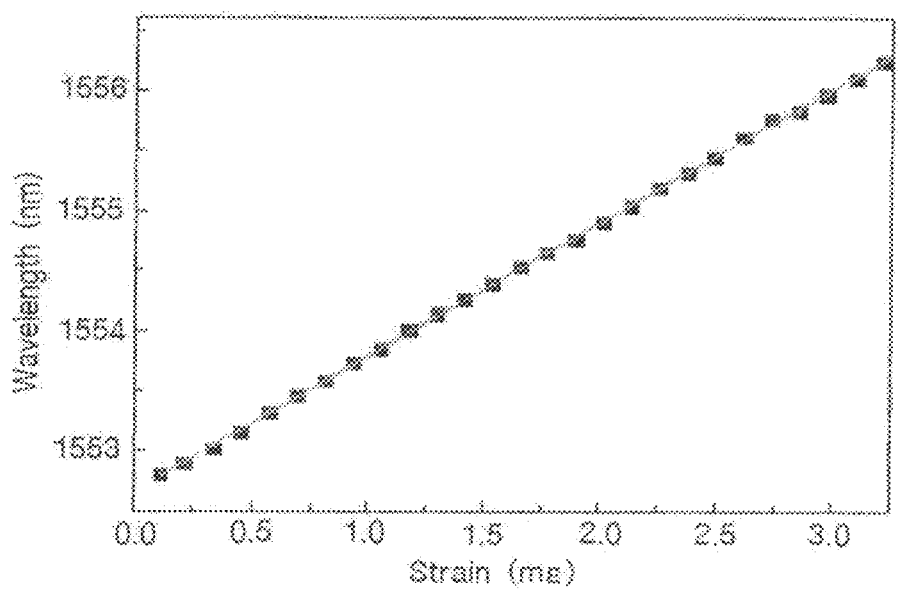
FIG. 7 is a graph showing a variation in wavelength when a strain is applied to the second sensor of FIG. 1.

FIG. 6 is a graph showing example 2 in which the variation of autocorrelation value was observed after a pressure was applied to the second sensor 105b among the first to third sensors 105a, 105b, and 105c shown in FIG. 1, and FIG. 7 is a graph showing the variation of wavelength when a strain was applied to the second sensor 105b of FIG. 1.

Referring to FIGS. 6 and 7, it may be seen that the autocorrelation time was shortened due to strain. That is, the autocorrelation time was shortened by 0.05 ms when the strain applied on the second sensor 105b by increasing 0.36 [µε] step, and the time shift (sliding) of the second sensor 105b occurred by high negative dispersion slop of DCF. The first sensor 105a and the third sensor 105c have a time shift deviation of 6.4 [µs] and 8.6 [µs] when the strain was applied on the second sensor 105b. Thus, the first sensor 105a and the third sensor 105c are independent with variation of the second sensor 105b so the sensing apparatus according to the present invention has a low crosstalk and high reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A sensing apparatus comprising:
a broadband optical source;
a first pseudorandom number generator generating a first pseudorandom number code string to modulate the broadband optical source;
at least one sensor reflecting an output of the first pseudorandom number generator at a wavelength corresponding to a center wavelength thereof when the output of the first pseudorandom number generator is inputted;
a wavelength-time converter converting an output of the sensor by wavelength-time conversion;

a second pseudorandom number generator generating a second pseudorandom number code string which is different in frequency from and is the same in bit length and code string as the first pseudorandom number code string;

a mixer mixing an output signal of the wavelength-time converter with an output signal of the second pseudorandom number generator; and an integrator integrating an output of the mixer.

2. The sensing apparatus according to claim 1, wherein the broadband optical source comprises a high luminance light emitting diode.

3. The sensing apparatus according to claim 1, wherein the broadband optical source comprises a semiconductor optical amplifier.

4. The sensing apparatus according to claim 1, wherein the broadband optical source comprises a reflective semiconductor optical amplifier.

5. The sensing apparatus according to claim 1, further comprising an optical amplifier amplifying the modified broadband optical source and inputting the modified and amplified broadband optical source to the sensor.

6. The sensing apparatus according to claim 1, wherein the sensor comprises a reflector reflecting a wavelength corresponding to a center wavelength thereof.

7. The sensing apparatus according to claim 6, wherein the reflector is connected to an output terminal of the broadband optical source.

8. The sensing apparatus according to claim 6, wherein the reflector is a Bragg grating or a thin dielectric filter having single wavelength full reflection or partial reflection characteristics.

9. The sensing apparatus according to claim 1, further comprising a light detector provided between the wavelength-time converter and the mixer.

10. The sensing apparatus according to claim 9, further comprising a band pass filter provided between the wavelength-time converter and the light detector and having a wavelength corresponding to a wavelength of each sensor.

11. The sensing apparatus according to claim 9, further comprising an electric signal amplifier provided between the light detector and the mixer to amplify an output of the light detector.

12. The sensing apparatus according to claim 1, wherein the at least one sensor comprises a plurality of sensors which are distributed in series, in parallel, in a ring shape, in a star shape, or in a bus shape.

13. The sensing apparatus according to claim 1, further comprising an interface device providing a user with a variation in time in an output of the integrator.

14. The sensing apparatus according to claim 13, wherein the interface device is an oscilloscope.

15. A sensing apparatus comprising:
a broadband optical source;
a first pseudorandom number generator generating a first pseudorandom number code string to modulate the broadband optical source;
a optical amplifier amplifying the modulated broadband optical source;
at least one sensor reflecting an output of the first pseudorandom number generator at a wavelength corresponding to a center wavelength thereof when the output of the first pseudorandom number generator is inputted;
a wavelength-time converter converting an output of the sensor by wavelength-time conversion;
a light detector converting an output of the wavelength-time converter to an electrical signal;
an electrical signal amplifier amplifying an output of the light detector;
a second pseudorandom number generator generating a second pseudorandom number code string which is different in frequency from and is the same in bit length and code string as the first pseudorandom number code string;
a mixer mixing an output signal of the electrical signal amplifier with an output of the second pseudorandom number generator; and
an integrator integrating an output of the mixer.

16. The sensing apparatus according to claim 15, wherein the broadband optical source comprises at least one of a high luminance light emitting diode, a semiconductor optical amplifier, or a reflective semiconductor optical amplifier.

17. The sensing apparatus according to claim 15, wherein the sensor comprises a reflector reflecting a wavelength corresponding to a center wavelength thereof.

18. The sensing apparatus according to claim 17, wherein the reflector is connected to an output terminal of the broadband optical source.

19. The sensing apparatus according to claim 17, wherein the reflector is a Bragg grating or a thin dielectric filter.

20. A sensing apparatus comprising:
a broadband optical source;
a first pseudorandom number generator generating a first pseudorandom number code string to modulate the broadband optical source;
at least one sensor reflecting an output of the first pseudorandom number generator at a wavelength corresponding to a center wavelength thereof when the output of the first pseudorandom number generator is inputted;
a second pseudorandom number generator generating a second pseudorandom number code string which is different in frequency from and is the same in bit length and code string as the first pseudorandom number code string;
a mixer mixing an output signal of the sensor with an output signal of the second pseudorandom number generator; and
an integrator integrating an output of the mixer.

* * * * *